United States Patent [19]

Newton

[11] Patent Number: 5,344,601
[45] Date of Patent: Sep. 6, 1994

[54] MOLDING METHOD USING TWO DIFFERENT RESINS AND A MEMBRANE

[76] Inventor: John Newton, Brackenthwaite House, Black Beck Wood, Stoors Park, Bowness, Cumbria LA23 31S, United Kingdom

[21] Appl. No.: 784,410
[22] PCT Filed: Jul. 2, 1990
[86] PCT No.: PCT/GB90/01014
  § 371 Date: May 4, 1992
  § 102(e) Date: May 4, 1992
[87] PCT Pub. No.: WO91/00171
  PCT Pub. Date: Jan. 10, 1991

[30] Foreign Application Priority Data

Jul. 4, 1989 [GB] United Kingdom ............. 8915369.6

[51] Int. Cl.$^5$ ................... B29C 45/16; B29C 45/13
[52] U.S. Cl. ..................... 264/255; 264/257; 264/260; 264/313; 264/316; 264/328.8; 264/510
[58] Field of Search .......... 264/257, 258, 255, 259, 264/260, 313, 314, 316, 510, 328.8, 516

[56] References Cited

U.S. PATENT DOCUMENTS

| | | | |
|---|---|---|---|
| 3,087,201 | 4/1963 | Williams et al. | 264/260 |
| 3,549,477 | 12/1970 | Burgman | 264/260 |
| 3,761,560 | 9/1973 | Newlove | 264/257 |
| 4,123,488 | 10/1978 | Lawson | 264/257 |
| 4,435,349 | 3/1984 | Dominquez et al. | 264/257 |
| 4,473,208 | 9/1984 | Nava | 264/314 |
| 4,636,422 | 1/1987 | Harris et al. | 264/257 |
| 4,714,575 | 12/1987 | Preston | 264/257 |
| 4,758,395 | 7/1988 | Zion | 264/258 |
| 4,781,876 | 11/1988 | Kia | 264/259 |
| 5,034,173 | 7/1991 | Altman et al. | 264/257 |
| 5,074,771 | 12/1991 | Thakrar et al. | 264/255 |
| 5,089,206 | 2/1992 | Kia | 264/255 |
| 5,132,069 | 7/1992 | Newton | 264/257 |

FOREIGN PATENT DOCUMENTS

| | | |
|---|---|---|
| 0156148 | 10/1985 | European Pat. Off. . |
| 0247708 | 12/1987 | European Pat. Off. . |
| 55-51533 | 4/1980 | Japan ............. 264/257 |
| 85-00141 | 1/1985 | World Int. Prop. O. . |
| 89-00495 | 1/1989 | World Int. Prop. O. . |

Primary Examiner—Jay H. Woo
Assistant Examiner—Duane S. Smith
Attorney, Agent, or Firm—Reising, Ethington, Barnard, Perry & Milton

[57] ABSTRACT

An injection molding method which injects a first resin in a first cavity (1) and a second resin in a second cavity (2) with a flexible fabric and porous membrane (3) spanning the interior of the cavity to inpart define the two cavities (1, 2). The second cavity is filled with fibers (14) and is vented via vents (6). The first resin injected into cavity (1) can penetrate the membrane (3) and fuse with the second resin in cavity (2). A nozzle (5) penetrates the membrane (3) with the membrane forming a seal thereabout for delivery of the second resin to the cavity (2).

17 Claims, 2 Drawing Sheets

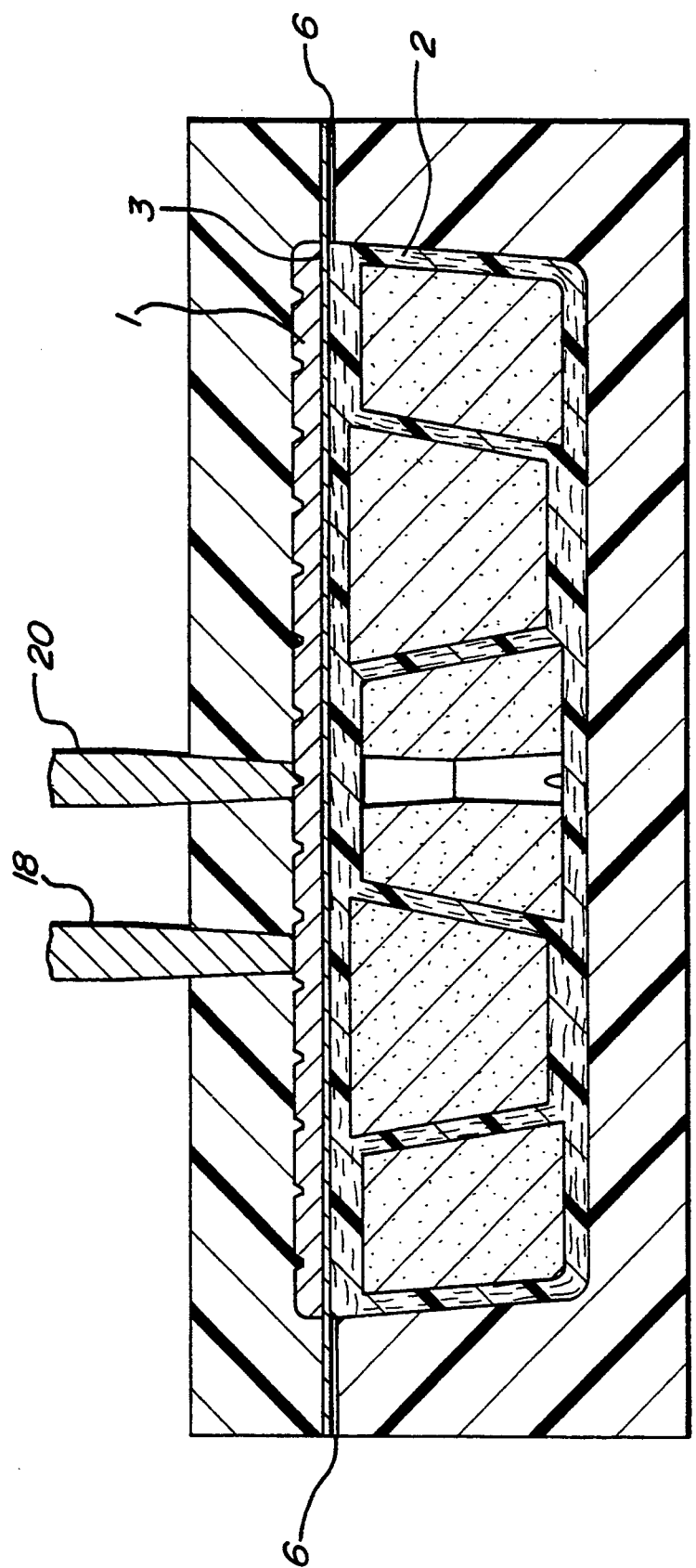

MOLDING METHOD USING TWO DIFFERENT RESINS AND A MEMBRANE

BACKGROUND OF THE INVENTION

1. Field of the Invention

This invention relates to a method of molding and in particular to a method of molding fiber-reinforced resin composite materials.

2. Description of the Background

Products and components made from high strength composites consisting of reinforcing fibers bonded in a matrix material system such as synthetic resin are continually finding new applications as their strength-to-weight advantages are realised and exploited. However, there are certain applications where the surface properties of the product cannot be achieved by the matrix material system employed in forming the component. Secondary coating processes, such as in-mold coating, can be used but in general these are restricted to thin coatings and they always complicate the production process and therefore add cost.

An example of such a product is an access chamber cover of the type described in European Patent No. 1047050. For this type of cover to be suitable for use in the highway it must have a top surface of sufficient thickness to contain a tread pattern and this surface must have exceptional wear and high friction properties. Such a surface coating requires the use of special resins in conjunction with the inclusion of aggregates, and it is very difficult to apply the secondary coating.

SUMMARY OF THE INVENTION

The method of the invention seeks to provide an improved manufacturing process which will allow the injection of two or more matrix material systems within a single moulding cycle of a component. Each matrix material system may, independently, have the ability to incorporate fibre reinforcement, aggregates, various fillers and the like.

According to the present invention there is provided a method of molding a composite article which comprises providing a mold adapted to receive a first matrix component for molding the article, inserting a membrane in the mold so as to define at least two contiguous volumes separated thereby, injecting the first matrix system on one side of the said membrane and injecting a second matrix system on the other side of the membrane.

Preferably the first matrix system has the characteristics required for the surface and, in effect, provides the surface coating on the finished composite article. It will preferably be a curable resin system and may contain fibre reinforcement, aggregates, various fillers and the like to give the necessary wear and surface friction properties.

The membrane acts as a boundry between the two volumes and allows injection of one matrix material system into the chosen volume confining it to that predetermined volume within the mould. The second matrix material may be injected into the other contiguous volume and the membrane is preferably adapted to allow one of the matrix systems to diffuse into the other so as to fuse, chemically combine or otherwise bond prior to or as part of the curing process for the article. The second matrix system may be a curable plastics resin system as used in our above mentioned European patent. The matrix component may be a cloth or batt of fibers, e.g. glass fibers, and may contain one or more foam inserts.

A membrane suitable for use on the method of the invention may be made in a number of different ways and the most suitable membrane will depend on the product and matrix material systems employed. Examples of suitable membrane systems are described below.

1) A membrane is formed from a woven, knitted or non-woven fabric with pore sizes of a predetermined value intended for use with matrix material systems of different viscosities. One volume can be injected with higher viscosity material which would be contained by the membrane after which the second volume is injected with the lower viscosity material which would penetrate the membrane and come into direct contact with the first material.

2) A membrane similar to that in paragraph 1 above maybe be coated and hence sealed with a thin film of nonporous material but the membrane or coating is dissolved by the second matrix material injected, thereby allowing direct contact between the two matrix materials.

3) A membrane may be made from a pre-impregnated reinforcement material normally used in the molding system, such as a resin impregnated glass fibre cloth or batt, which on contact with the injected matrix materials integrates with them and proceeds to cure as part of the curing process.

4) A membrane may be made from a fabric such that the first matrix material system coming into contact with one side of the fabric has the effect of "blinding" the fabric and hence blocking the matrix material from penetrating through it. The second matrix material injected from the opposite side can penetrate the membrane and make direct contact with the first injected material.

Naturally other forms of membrane could be employed as could combinations of the forms described above.

BRIEF DESCRIPTION OF THE DRAWINGS

The invention will now be described, by way of example, with reference to the accompanying drawings, in which:

FIG. 2 is a similar view to FIG. 1 after injection has been completed.

DETAILED DESCRIPTION OF THE PREFERRED EMBODIMENT

Figure 1:
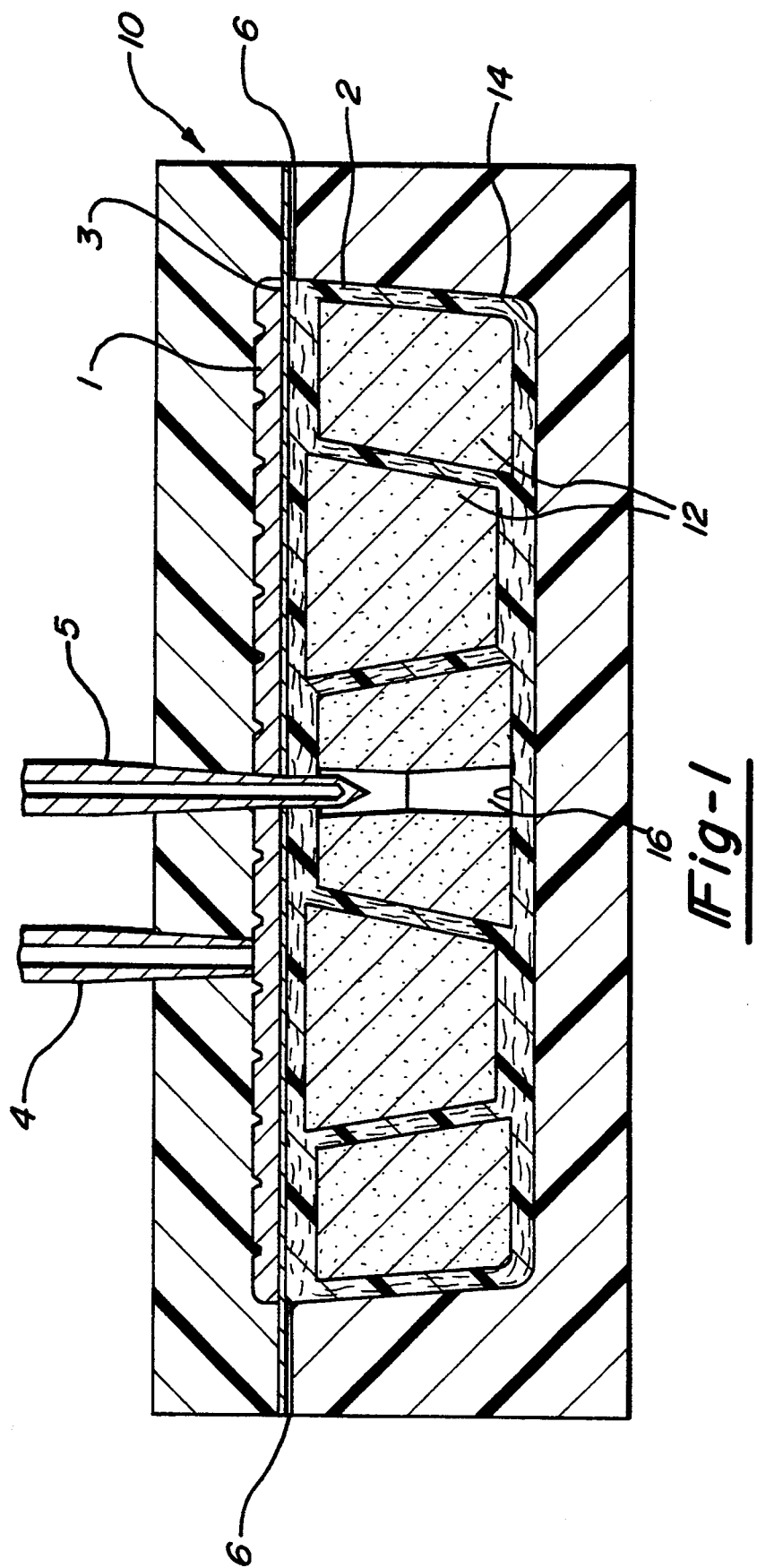
FIG. 1 is a sectional view of a mold for producing a manhole cover of the type described in European Patent No. 1047050.

Referring to the drawings, a mold generally designated (10) is illustrated for producing a manhole cover suitable for highway installation which will therefore have an upper surface portion of sufficient thickness to contain a tread pattern which will also have exceptional wear properties and high friction properties. As described in our PCT publication No. WO89/00495 the basic product comprises foam insert (12) about which reinforcing fibers (14) are arranged. The central gallery (16) gives access to the upper and lower fiber layers and a nozzle (5) is inserted directly into the gallery (16) to inject a matrix system, in this case a curable synthetic resin, into the fibers (14) whereby to produce the composite manhole cover or other rigid structure. The cover is more fully described in our above mentioned European Patent, and in our PCT patent publication No. WO89/00495.

As modified in accordance with the method of the present invention, a membrane (3) is provided above the upper layer of fibres (14) effectively dividing the interior mold space into two volumes (1) and (2) respectively. The nozzle (5), as already described, penetrates into the gallery (16) in the volume (2) passing through the membrane (3) and being arranged to sealingly engage with it. A second nozzle (4) is provided communicating with the volume (1).

In operation, the matrix material systems of the surface layer may be injected in a precise quantity, through the nozzle (4) into volume (1). The air in volume (1) would then escape through the membrane into volume (2) and out to atmosphere through vents (6). The matrix material would be confined in volume (1) by the membrane (3). An even hydraulic pressure would be applied onto the membrane by the matrix material thus applying an even pressure onto the fiber (14) and foam core (12) of the basic composite structure. This is arranged to force the structure to occupy its designed volume. The resin employed as the second matrix material system for the volume (2) would be injected through nozzle (5). The air in the volume 2 would vent via the vents (6) once again. On completion of the injection cycle nozzles (4 & 5) are withdrawn and the holes plugged with plugs (18), (20) (as illustrated in FIG. 2) after which the resin systems within the mold are cured or allowed to cure. On completion of the curing process of the two matrix systems, the component would be demolded.

For thin surface coatings it may prove beneficial to inject volume (2) first and allow the injection into volume (1) to force excess matrix material from volume (2) out through the vent (6). It is preferable to inject volumes (1 & 2) from the same side of the mold as this simplifies the mold equipment required. If there were more than two, for example three, volumes then penetration of a nozzle through one volume and a membrane may prove the only method of injection possible.

It will be appreciated that other combinations of injection sequences may be employed to suit individual circumstances.

The method of this invention, especially when combined with the direct injection system described in our PCT patent publication No. WO89/00495 provides an exceptionally versatile process for the manufacture of advanced complex composite components for diverse applications.

I claim:

1. A method of molding a composite rigid article which comprises providing a mold adapted to receive a first matrix component for molding the article, inserting a flexible membrane in the mold so as to define first and second contiguous volumes separated thereby, said second volume being full of reinforcing fiber, said membrane acts as a boundary between said first and second volumes, injecting a first resinous matrix material on one side of the said membrane into said first volume thereby decreasing the size of the second volume and at a rate to provide a pressure buildup serving to compress the fibers within said second volume, injecting a second resinous matrix material on the other side of the membrane into said second volume and curing the system to form said rigid article, while said pressure buildup is maintained in said second volume.

2. A method as claimed in claim 1 in which the first matrix resinous material forms a wear resistant surface and provides a surface coating on the finished composite article.

3. A method as claimed in claim 1 in which the membrane is adapted to allow one of said first or second matrix resinous material to diffuse into the other of said first or second resinous material so as to chemically bond together prior to or as part of the curing process for the article.

4. A method as claimed in claim 1 in which the membrane is formed from a flexible porous fabric with pore sizes of a predetermined value intended for use with matrix resinous material of different viscosities, one of said first and second volumes is injected with higher viscosity material which is contained by the membrane after which the other of said first and second volumes is injected with the lower viscosity material which penetrates the membrane and comes into direct contact with the said first resinous matrix material.

5. A method as claimed in claim 1 in which the membrane is formed from a flexible porous fabric which is coated and hence sealed with a thin film of nonporous material, the coating being dissolved by the second matrix resinous material injected, thereby allowing direct contact between the two matrix materials.

6. A method as claimed in claim 1 in which the membrane is made from a pre-impregnated reinforcement material normally used in the molded system, which on contact with the injected matrix materials integrates with them and proceeds to cure as part of the curing process.

7. A method as claimed in claim 6 in which the material is selected from one of a resin impregnated glass fiber cloth and batt.

8. A method as claimed in claim 1 in which one of said first and second resinous matrix materials is injected into said respective volume by means of a nozzle passing through the mold into that said respective volume, and the other of said first and second matrix materials is injected into the other respective volume by another nozzle passing through said respective volume and the membrane.

9. A method as claimed in claim 8 in which the said another nozzle sealingly engages with the membrane as it passes therethrough.

10. A method as claimed in claim 1 in which each matrix resinous material is a curable plastics material resin which may incorporate reinforcing fillers.

11. A method as claimed in claim 1 further characterized by;
said second volume being vented to ambient atmosphere and said first volume not being vented to ambient atmosphere such that hydraulic pressure may build up in said first volume when said first resinous matrix material is injected into said first volume on the other side of said membrane and forcing said membrane against said fibers to compress said fibers within said second volume.

12. A method as claimed in 11 in which the first matrix resinous material forms a wear resistant surface and provides a surface coating on the finished composite article.

13. A method as claimed in claim 11 in which the membrane is adapted to allow one of said first or second matrix resinous material to diffuse into the other of said first or second resinous material so as to chemically bond together prior to or as part of the curing process for the article.

14. A method as claimed in claim 11 in which the membrane is formed from a flexible porous fabric with pore sizes of a predetermined value intended for use with matrix resinous material of different viscosities, one of said first and second volumes is injected with higher viscosity material which is contained by the membrane after which the other of said first and second volumes is injected with the lower viscosity material which penetrates the membrane and comes into direct contact with the said first resinous matrix material.

15. A method as claimed in claim 1 in which the membrane is made from a pre-impregnated reinforcement material normally used in the molded system, which on contact with the injected matrix materials integrates with them and proceeds to cure as part of the curing process.

16. A method as claimed in claim 11 in which the material is selected from one of a resin impregnated glass fiber cloth and batt.

17. A method as claimed in claim 11 in which one of said first and second resinous matrix materials is injected into said respective volume by means of a nozzle passing through the mold into that said respective volume, and the other of said first and second matrix materials is injected into the other respective volume by another nozzle passing through said respective volume and the membrane.

* * * * *